United States Patent
Devlieg

(10) Patent No.: US 7,416,059 B2
(45) Date of Patent: *Aug. 26, 2008

(54) SYSTEM AND METHOD FOR AIRCRAFT BRAKING SYSTEM USAGE MONITORING

(75) Inventor: Garrett H. Devlieg, Bellevue, WA (US)

(73) Assignee: Hydro-Aire, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/744,137

(22) Filed: May 3, 2007

(65) Prior Publication Data

US 2007/0200427 A1    Aug. 30, 2007

Related U.S. Application Data

(60) Division of application No. 11/127,666, filed on May 11, 2005, which is a continuation of application No. 10/689,786, filed on Oct. 20, 2003, now Pat. No. 6,929,333, which is a continuation of application No. 10/008,607, filed on Dec. 4, 2001, now Pat. No. 6,659,233.

(51) Int. Cl.
*F16D 66/02* (2006.01)

(52) U.S. Cl. .............................. 188/1.11 E; 188/1.11 L

(58) Field of Classification Search ............. 188/1.11 E, 188/1.11 L; 303/191; 340/454; 73/129, 73/130

See application file for complete search history.

(56) References Cited

U.S. PATENT DOCUMENTS

| | | | |
|---|---|---|---|
| 3,438,351 A | 4/1969 | Kirkwood | |
| 4,007,894 A | 2/1977 | Hartel | |
| 4,050,548 A | 9/1977 | Margetts | |
| 4,384,214 A | 5/1983 | Crick et al. | |
| 4,482,961 A | 11/1984 | Kilner et al. | |
| 4,525,782 A | 6/1985 | Wohlfarth et al. | |
| 4,651,020 A | 3/1987 | Kenny et al. | |
| 4,658,936 A * | 4/1987 | Moseley | 188/1.11 R |

(Continued)

FOREIGN PATENT DOCUMENTS

DE    3236520 A1    4/1984

(Continued)

*Primary Examiner*—Christopher P Schwartz
(74) *Attorney, Agent, or Firm*—Fulwider Patton LLP

(57) ABSTRACT

The system and method for monitoring wear of one or more aircraft parts, such as an aircraft brake, an aircraft tire, a standby system, and landing gear. One or more sensors are provided for sensing a parameter of usage, and an estimate of usage of the part can be determined based upon the signal indicating the sensed value of the parameter of usage of the aircraft part. A plurality of sensors can be provided for sensing usage of a plurality of parts of the aircraft, and the estimate of usage of the part can be stored for access of the estimate by ground personnel. As applied to monitoring wear of an aircraft brake, a linear brake wear indicator attached to the brake moves a discrete distance when the brake is actuated, and a linear position encoder measures the distance traveled by the linear brake wear indicator as an indication of brake usage. A wheel speed monitor may also be provided for measuring the aircraft wheel speed, for distinguishing between static brake applications and moving brake applications, based upon the wheel speed signal.

1 Claim, 4 Drawing Sheets

U.S. PATENT DOCUMENTS

| | | | |
|---|---|---|---|
| 4,790,606 A * | 12/1988 | Reinecke | 303/191 |
| 4,989,537 A * | 2/1991 | Hutchinson et al. | 116/208 |
| 5,012,903 A | 5/1991 | Maligne et al. | |
| 5,087,907 A | 2/1992 | Weiler et al. | |
| 5,216,286 A | 6/1993 | Peterson | |
| 5,228,541 A | 7/1993 | Plude | |
| 5,258,582 A | 11/1993 | Junginger | |
| 5,390,992 A | 2/1995 | Walenty et al. | |
| 5,400,879 A | 3/1995 | Johannessen | |
| 5,552,987 A | 9/1996 | Barger et al. | |
| 5,596,513 A * | 1/1997 | Schricker | 702/130 |
| 5,646,508 A | 7/1997 | Phuoc et al. | |
| 5,648,657 A | 7/1997 | Sundararajan et al. | |
| 5,668,529 A * | 9/1997 | Kyrtsos | 340/454 |
| 5,697,472 A * | 12/1997 | Walker et al. | 188/1.11 W |
| 5,734,173 A * | 3/1998 | Braun | 250/559.29 |
| 5,845,975 A | 12/1998 | Wells | |
| 5,848,672 A | 12/1998 | Brearley et al. | |
| 5,939,978 A * | 8/1999 | Kyrtsos | 340/454 |
| 5,992,579 A * | 11/1999 | Kyrtsos | 188/79.52 |
| 6,003,640 A | 12/1999 | Ralea | |
| 6,220,676 B1 * | 4/2001 | Rudd, III | 303/150 |
| 6,250,430 B1 * | 6/2001 | Kyrtsos | 188/1.11 L |
| 6,257,374 B1 | 7/2001 | Strzelczyk et al. | |
| 6,260,665 B1 * | 7/2001 | Kramer et al. | 188/1.11 L |
| 6,262,493 B1 | 7/2001 | Garnett | |
| 6,293,141 B1 | 9/2001 | Nance | |
| 6,304,807 B1 | 10/2001 | Kirchberger et al. | |
| 6,313,742 B1 | 11/2001 | Larson | |
| 6,366,833 B1 | 4/2002 | Fukuyama | |
| 6,397,977 B1 | 6/2002 | Ward | |
| 6,471,015 B1 * | 10/2002 | Ralea et al. | 188/1.11 L |
| 6,478,252 B1 * | 11/2002 | Stimson et al. | 244/111 |
| 6,484,080 B2 | 11/2002 | Breed | |
| 6,498,967 B1 | 12/2002 | Hopkins et al. | |
| 6,539,783 B1 | 4/2003 | Adibhatla | |
| 6,542,077 B2 | 4/2003 | Joao | |
| 6,651,012 B1 | 11/2003 | Bechhoefer | |
| 6,659,233 B2 * | 12/2003 | DeVlieg | 188/1.11 E |
| 6,929,333 B2 * | 8/2005 | DeVlieg | 303/20 |
| 7,244,003 B2 * | 7/2007 | Larson | 303/191 |
| 2004/0011596 A1 * | 1/2004 | Miller et al. | 188/1.11 W |

FOREIGN PATENT DOCUMENTS

| | | |
|---|---|---|
| EP | 0978665 A1 | 2/2000 |
| WO | 95/33933 A1 | 12/1995 |
| WO | 98/46972 A1 | 10/1998 |
| WO | 02/12003 A2 | 2/2002 |
| WO | 02/12043 A1 | 2/2002 |

* cited by examiner

SYSTEM AND METHOD FOR AIRCRAFT BRAKING SYSTEM USAGE MONITORING

CROSS-REFERENCES TO RELATED APPLICATIONS

This is a divisional of Ser. No. 11/127,666, filed May 11, 2005, which is a continuation of Ser. No. 10/689,786, filed Oct. 20, 2003, now U.S. Pat. No. 6,929,333, which is a continuation of Ser. No. 10/008,607, filed Dec. 4, 2001, now U.S. Pat. No. 6,659,233. Each of these applications is hereby incorporated herein by reference as if set forth in full herein.

BACKGROUND OF THE INVENTION

1. Field of the Invention

This invention relates generally to monitoring of usage of aircraft parts, systems and functions, and more particularly concerns monitoring of aircraft braking systems.

2. Description of Related Art

Automatic braking systems have been commonly provided on commercial aircraft to aid the deceleration of the aircraft upon landing. As the size and complexity of aircraft have increased, the automatic braking systems have also become more complex and computerized. Modern anti-skid systems incorporated into aircraft braking systems commonly optimize braking efficiency by adapting to runway conditions and other factors which affect braking in order to optimize deceleration, typically corresponding to the level of brake pressure selected by the pilot.

In a conventional skid detection system used in aircraft braking systems typically includes a wheel speed transducer for each wheel brake of the wheels of the aircraft, for measuring wheel speed and generating wheel speed signals that are a function of the rotational speed of the brake wheel. The wheel speed signal is typically converted to a signal representing the velocity of the aircraft, and compared with a desired reference velocity, to generate wheel velocity error signals indicative of the difference between the wheel velocity signals from each braked wheel and the reference velocity signal for providing anti-skid control of aircraft braking.

Aircraft brakes often constitute the most expensive single maintenance item to the airlines, because they wear out and are expensive to replace. The demands on aircraft brakes are extraordinary due to the high speeds at which aircraft braking typically occurs, causing aircraft brakes to periodically wear out and require replacement. In emergency braking situations, reverse thrust may not be available, high performance engines can take several seconds to reduce thrust, and flight control surfaces may be able to generate little aerodynamic drag, placing the burden of slowing the aircraft almost completely on the aircraft braking system. In such situations, although the aircraft wheel size may be comparable to that of an average car, the amount of energy that must be absorbed per brake can be equivalent to what a car brake would absorb completely stopping an average car from a speed of 60 miles an hour 200 times.

Aircraft brakes are typically have a brake stack formed of multiple disks, in which the key elements are the rotors and stators which absorb the energy of a stop. The rotors are keyed to and rotate along with the wheels, while the stators, tied to the axle, are stationary. Hydraulically operated brake pistons compress the rotors and stators together to provide the frictional forces necessary to brake an aircraft. One or more metal wear pins are attached to the pressure plate, or first stator, of a brake stack, and extend through a hole in the brake's actuator housing. When the brake is new, the pins extend past the housing by some amount (e.g. one or two inches). As the brake wears, the pressure plate moves away from the brake actuator housing, and the wear pins move with the pressure plates. The stroke of the brake pistons is automatically adjusted by brake actuator adjusters based upon the brake wear indicated by the wear pins, so that when the brakes are released, the actuators only retract a fixed small amount, independent of brake wear.

Aircraft brakes are commonly guaranteed for a given number of landings, and the number of landings is commonly used as the overall measure of brake usage. However, the rate at which aircraft brakes wear and require replacement, and hence the cost of maintenance of aircraft brakes, is heavily dependent upon how such aircraft brakes are used. Factors such as aircraft wheel speed and brake pressure, as well as how an operator applies brakes during each flight cycle can greatly affect aircraft brake wear. There thus remains a need for an improvement in the monitoring of aircraft brake usage. Improved aircraft brake usage monitoring would provide a better basis for guaranteeing brakes, and would provide valuable data to help the airline operator improve landing and braking procedures to achieve lower brake costs. The present invention meets these needs.

SUMMARY OF THE INVENTION

Briefly, and in general terms, the present invention provides for a system and method for monitoring aircraft braking system usage that can reduce aircraft operating costs by providing data which may be used to better guide operating and maintenance procedures. The present invention provides for continuous monitoring of brake wear, and stores one or more key parameters affecting brake wear for periodic access by ground personnel. The brake usage data will provide a more accurate basis for guaranteeing the life of aircraft brakes, determining when aircraft brakes need to be replaced, and will provide data for improving pilot landing and braking techniques to achieve better brake economics.

The present invention accordingly provides for a system and method for monitoring wear of one or more aircraft parts. In a presently preferred embodiment, an aircraft brake is monitored for wear, although the invention can also apply to monitoring of wear of other aircraft parts, such as an aircraft tire, a standby system, landing gear, and the like. In the system and method of the invention, one or more sensors are provided for sensing a parameter of usage of the one or more aircraft parts and for generating a signal indicating a sensed value of the parameter of usage of the aircraft part. An estimate of usage of the part is determined based upon the signal indicating the sensed value of the parameter of usage of the aircraft part. In one preferred aspect, the estimate of usage of the part is stored for access of the estimate by ground personnel. In another preferred aspect, the one or more sensors for sensing a parameter comprises a plurality of sensors for sensing usage of a plurality of parts of the aircraft, and the means for determining an estimate of usage comprises a central computer.

In a presently preferred embodiment, an aircraft brake is monitored for wear, and the one or more sensors comprise a linear brake wear indicator attached to the brake. Each time the brake is actuated, the linear brake wear indicator moves a discrete distance, and a linear position encoder is provided for measuring and generating a linear position signal indicating the distance traveled by the linear brake wear indicator as an indication of brake usage. An estimate of brake usage is determined based upon the distance traveled by the linear brake wear indicator as indicated by linear position signal.

In one presently preferred embodiment, as applied to monitoring wear of an aircraft brake, a wheel speed monitor is provided for generating a wheel speed signal indicating wheel speed of the aircraft, and the means for determining an estimate of usage receives the wheel speed signal for distinguishing between static brake applications and moving brake applications, based upon the wheel speed signal. In another currently preferred aspect, means are provided for measuring the period of time elapsed during each brake application, and the distance over which each brake application occurs is determined based upon the wheel speed during each brake application and the period of time elapsed during each brake application, in order to determine the degree to which each individual brake application contributes to brake wear.

In another currently preferred embodiment, as applied to monitoring wear of an aircraft brake, a temperature sensor is provided for sensing brake temperature, and for generating a temperature signal indicating brake temperature that is received by the means for determining an estimate of usage. The estimate of brake usage can be determined based upon the input of the temperature signal. In another presently preferred aspect, the degree to which each individual brake application contributes to wear can be estimated based upon the temperature signal.

In another presently preferred embodiment, as applied to monitoring wear of an aircraft tire, a wheel speed monitor is provided for generating a wheel speed signal indicating wheel speed of the aircraft, and the wheel speed signal can be used for distinguishing between static brake applications and moving brake applications based upon the wheel speed signal, and for determining an estimate of tire usage. A sensor is also preferably provided for sensing aircraft yaw, and for generating a yaw signal indicating aircraft yaw, that can be used for determining an estimate of tire wear based upon the wheel speed signal and the yaw signal.

In another presently preferred embodiment, when the aircraft part to be monitored is a standby system, a sensor is provided for sensing input power to the standby system and for generating an input power signal used for determining an estimate of usage. Means are also preferably provided for measuring the period of time elapsed during each usage of the standby system and for generating an elapsed time signal for determining an estimate of usage of the standby system based upon the input power signal and the elapsed time signal.

In another presently preferred embodiment, when the aircraft part to be monitored is a landing gear, a sensor is provided for sensing load on the landing gear and for generating a load signal for determining an estimate of usage of the landing gear. Means are also preferably provided for measuring the period of time elapsed during each usage of the landing gear and for generating an elapsed time signal for determining an estimate of usage of the landing gear based upon the load signal and the elapsed time signal.

These and other aspects and advantages of the invention will become apparent from the following detailed description and the accompanying drawings, which illustrate by way of example the features of the invention.

DETAILED DESCRIPTION OF THE PREFERRED EMBODIMENTS

While wear of aircraft brakes is commonly estimated by the number of landings in which aircraft brakes are used, other factors affecting how aircraft brakes are used, including aircraft wheel speed and brake pressure, how an operator applies brakes during each flight cycle, and brake temperature. Improved brake usage monitoring can also be combined with the monitoring of usage of other aircraft parts, to provide a better basis for guaranteeing aircraft parts, and to provide valuable data to help the airline operator improve landing and braking procedures, as well as other operating procedures, to achieve lower operating costs.

Figure 1:
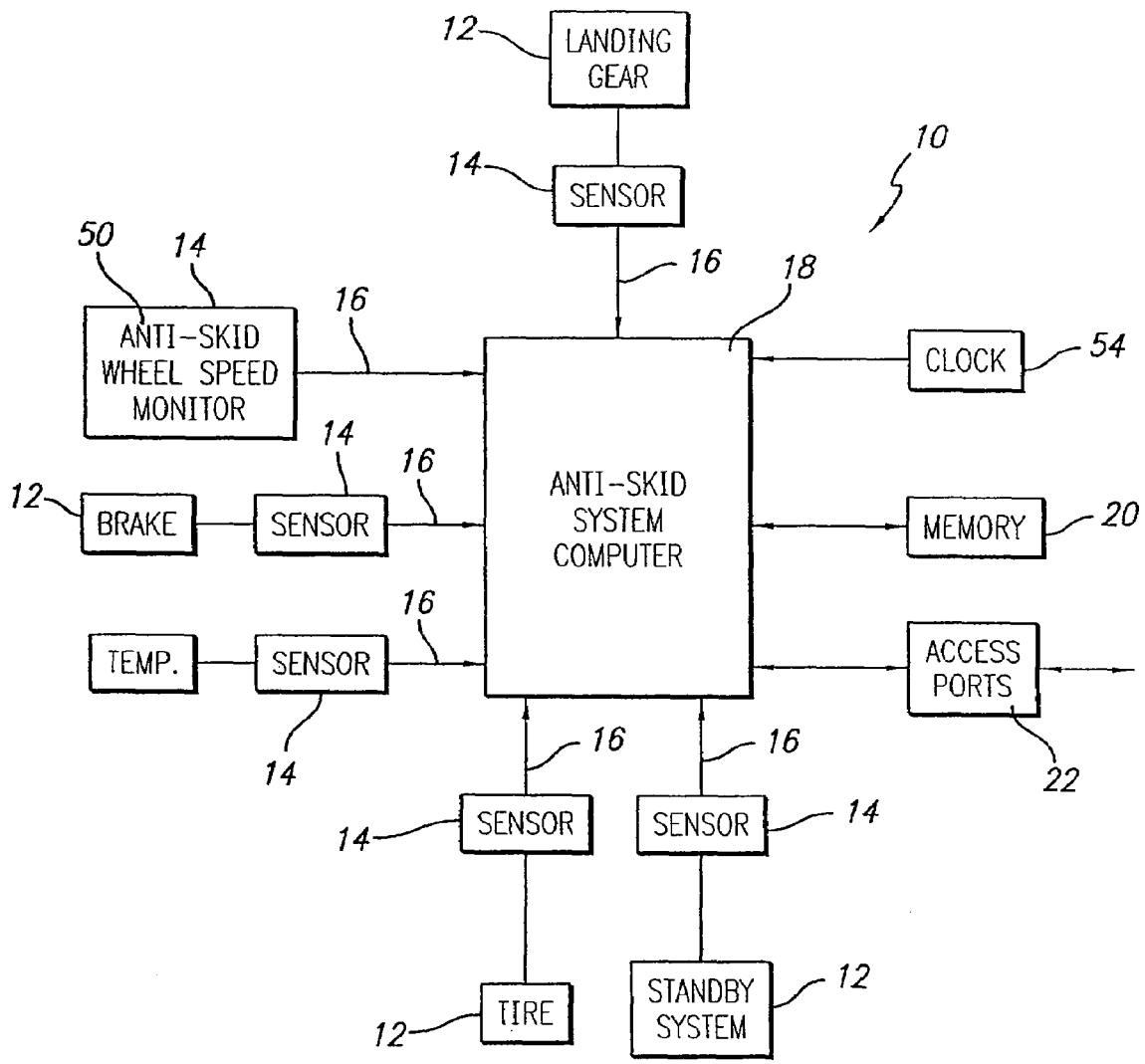
FIG. 1 is a schematic diagram generally illustrating the system and method of the invention for monitoring wear of one or more aircraft parts.

As is illustrated in the drawings, the invention accordingly provides for a system and method for monitoring wear of one or more aircraft parts. Referring to FIG. 1, a system 10 is provided for monitoring wear of one or more aircraft parts 12, utilizing one or more sensors 14 for sensing a parameter of usage of the one or more aircraft parts, respectively, and for generating signals 16 indicating a sensed value of the parameter of usage of the one or more aircraft parts, such as an aircraft brake, an aircraft tire, an aircraft standby system, an aircraft landing gear, and the like. In a presently preferred aspect, a plurality of sensors are provided for monitoring usage of a plurality of parts of an aircraft. The invention also provides for a control means 18 for determining an estimate of usage of the part based upon the signal indicating the sensed value of the parameter of usage of the aircraft part, such as a central computer of an anti-skid control system as will be further explained below, that receives the inputs of the one or more sensors. The control means for determining an estimate of usage preferably also includes storage means such as a computer memory 20 for storing the estimate of usage of the part, and means for accessing the information concerning the estimated part usage, such as one or more ports or terminals 22 providing access by ground equipment and personnel, for example.

Figure 2:
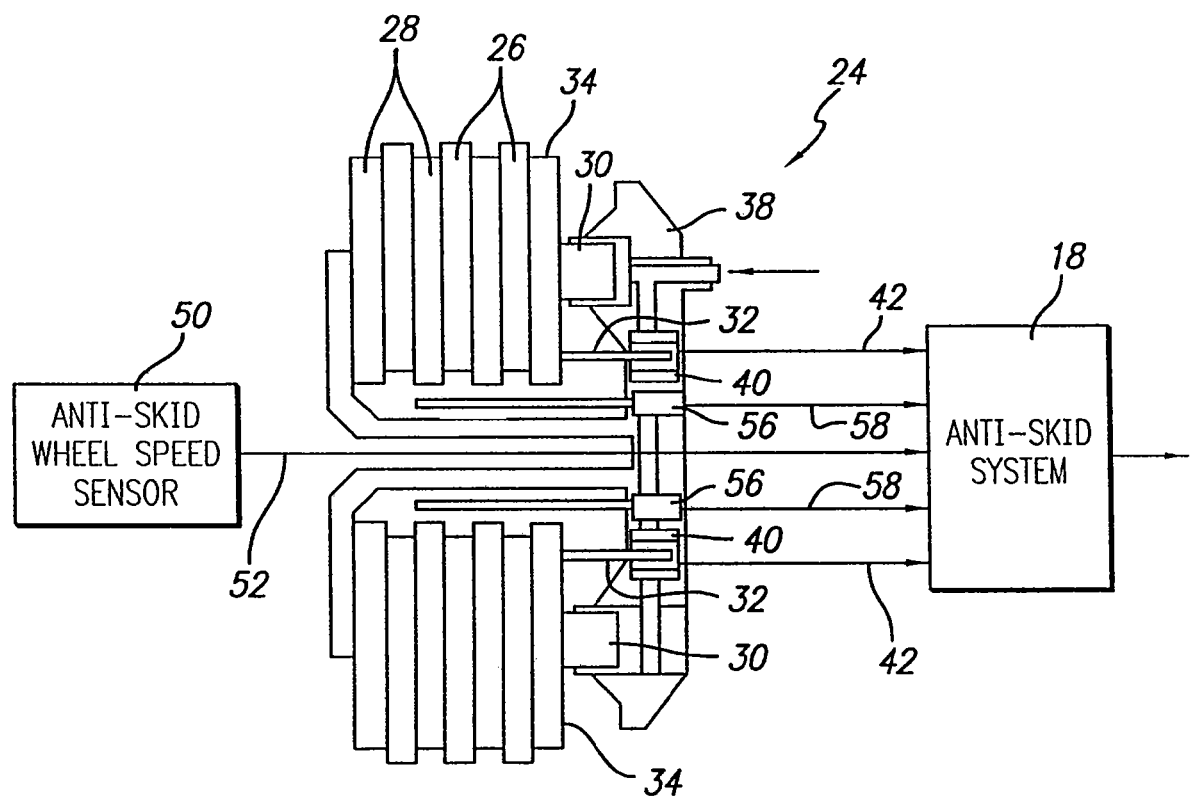
FIG. 2 is a schematic diagram illustrating a preferred embodiment of the system and method of the invention for monitoring wear of an aircraft brake.

In a presently preferred embodiment illustrated schematically in FIG. 2, the aircraft part for which usage is to be monitored is an aircraft brake 24, typically having a plurality of rotors 26 and stators 28 which absorb the energy of a stop. The rotors are keyed to and rotate along with the wheel (not shown), while the stators, tied to the axle (not shown), are stationary. In some brake designs, a light spring (not shown) may also be added to the wear pin to assure that the first stator of the brake remains in contact with the brake actuator at all times. Hydraulically operated brake pistons 30 compress the rotors and stators together to provide the frictional forces necessary to brake an aircraft. One or more linear brake wear indicators 32, such as metal wear pins, for example, are attached to the pressure plate 34, the first stator of the brake stack, and extend through a hole in the brake's actuator housing 38.

Each linear brake wear indicator extends to an associated linear position encoder 40 for measuring linear position of the corresponding linear brake wear indicator, which generates a linear position signal 42 indicating the linear position of the linear brake wear indicator and thereby the distance traveled by the linear brake wear indicator, since each time the brake is actuated, the linear brake wear indicator moves a discrete distance as the piston moves from its "Brakes Off" position to its "Brakes On" position that thus can be measured by observing maximum and minimum readings of the linear position sensor. This discrete amount remains relatively constant, independent of brake wear, as is provided for by the "Adjusters" typically present in brakes. The linear position signal is received by the control means, for determining an estimate of distance traveled by the linear brake wear indicator when the brake is actuated, as an indication of brake usage, and for determining an estimate of usage of the brake based upon the linear position signal.

Figure 3:
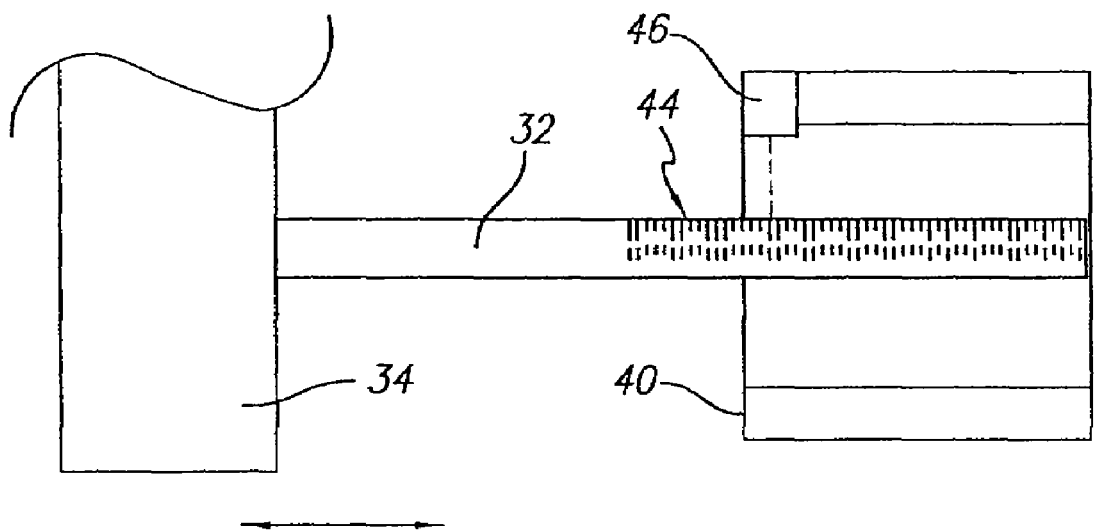
FIG. 3 is a schematic diagram of a linear brake wear indicator and linear position encoder of FIG. 2.

As is illustrated in FIG. 3, in a presently preferred embodiment, the linear brake wear indicator includes a plurality of longitudinally arranged markings 44 and the linear position encoder comprises an optical encoder 46 for counting the markings passing by the optical encoder for determining the distance traveled by the linear brake wear indicator upon brake actuation, for indicating the distance traveled by the linear brake wear indicator as an indication of brake usage. In an alternate embodiment, the markings on the linear brake wear indicator may include a plurality of longitudinally arranged digitized markings indicating longitudinal position on the linear brake wear indicator, and the linear position encoder may comprise an optical encoder for encoding the digitized markings, for indicating the distance traveled by the linear brake wear indicator as an indication of brake usage. This measure of brake applications can, on its own, provide a much superior measure of brake usage than a "number of landings" measure according to the current method of estimating brake wear. However, this invention provides for additional data to be monitored to yield a better measure of brake usage.

Referring again to FIG. 2, when the aircraft part for which usage is to be monitored is an aircraft brake, the system and method of the invention also utilizes a wheel speed monitor 50 for generating a wheel speed signal 52 indicating wheel speed of the aircraft. In one presently preferred aspect, the wheel speed monitor comprises a wheel speed sensor, and the control means receives the wheel speed signal for distinguishing between static brake applications and moving brake applications based upon the wheel speed signal. In an alternate preferred embodiment, the wheel speed monitor comprises an aircraft speed sensor, which can also be used for determining the wheel speed of the aircraft. As is illustrated in FIG. 2, the control means also preferably includes clock means 54 for measuring the period of time elapsed during each brake application, and means for determining the distance over which each brake application occurs, based upon the wheel speed during each brake application and the period of time elapsed during each brake application, for determining the degree to which each individual brake application contributes to brake wear.

Again with reference to FIG. 2, in another presently preferred aspect, when the aircraft part for which usage is to be monitored is an aircraft brake, the system and method of the invention optionally also utilizes a brake temperature sensor 56 for generating a brake temperature signal 58 that is received by the control means for determining an estimate of usage based upon the temperature signal. The control means preferably includes means for estimating the degree to which each individual brake application contributes to wear based upon the temperature signal.

Figure 4:
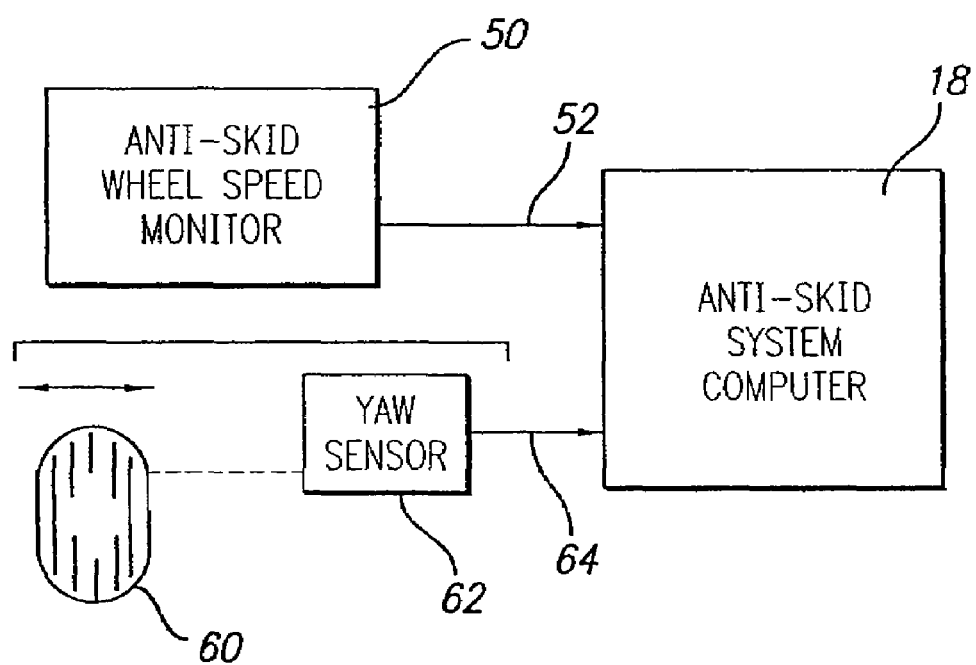
FIG. 4 is a schematic diagram illustrating a preferred embodiment of the system and method of the invention for monitoring wear of an aircraft tire.

In another presently preferred embodiment, illustrated in FIG. 4, the system and method of the invention can optionally monitor the usage and wear of an aircraft tire 60. Sensors that can be provided for sensing parameters of usage of an aircraft tire include the wheel speed monitor, as described above, and means 62 for sensing aircraft yaw, which is the side to side, turning about a vertical axis, such as by an inertial guidance system, such as the type using three gyroscopes and three accelerometers for determining a vehicle's roll, pitch, and yaw motion. The means for sensing aircraft yaw generates a yaw signal 64 indicating aircraft yaw, that is received as an input by the control means for determining an estimate of tire usage and wear, based upon the wheel speed signal and the yaw signal.

Figure 5:
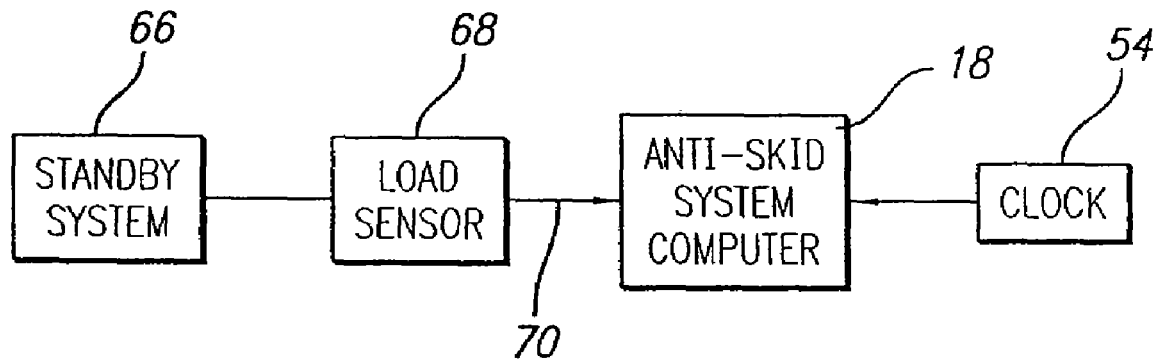
FIG. 5 is a schematic diagram illustrating a preferred embodiment of the system and method of the invention for monitoring wear of an aircraft standby system.

In another presently preferred embodiment, illustrated in FIG. 5, the system and method of the invention can optionally monitor the usage and wear of a standby system 66. Sensors that can be provided for sensing parameters of usage of a standby system include means 68 for sensing input power, such as a watt-hour meter for measuring the electric power flowing through a circuit to the standby system over time, which generates an input power signal 70 received as an input by the control means, for determining an estimate of usage of the standby system, based upon the standby system power signal, and an elapsed time signal from the system clock, as described above.

Figure 6:
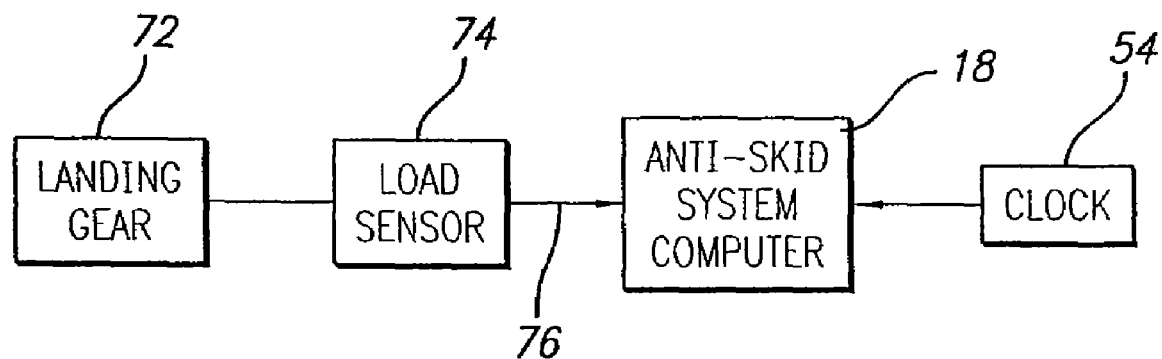
FIG. 6 is a schematic diagram illustrating a preferred embodiment of the system and method of the invention for monitoring wear of an aircraft landing gear.

In another presently preferred embodiment, illustrated in FIG. 6, the system and method of the invention can optionally monitor the usage and wear of an aircraft landing gear 72. Sensors that can be provided for sensing parameters of usage of an aircraft landing gear include means 74 for sensing load on the landing gear, such as one or more strain gauges or other type of strain sensors strategically placed on the landing gear, for example, and for generating a load signal 76 received as an input by the control means for determining an estimate of usage and wear of the aircraft landing gear, based upon the load signal and an elapsed time signal from the system clock, as described above.

As described above, the present invention provides for the gathering of the brake usage data, and optionally other part usage data, into a computer, where the part usage data is operated on to estimate brake wear and optionally other part wear, stored, and can be later accessed by ground personnel. Although there are numerous existing technologies for doing this, the embodiment illustrated and described uses the anti-skid system, since the anti-skid system already contains a wheel speed monitor and computer and, as such, is a convenient place. The exact algorithms used to estimate brake usage will vary with the exact brake or other part in question, and the degree of accuracy desired (e.g. brake temperature may not be included). In a presently preferred embodiment, the functions of the elements in the control means, including the clock means, means for determining distance, means for estimating the degree to which each individual brake application contributes to wear based upon brake temperature, for determining yaw and tire wear based upon yaw, for determining wear of a standby system, and for determining wear of an aircraft landing gear, are performed by one or more microprocessors under appropriate software control, although alternatively these or analogous functions may be performed by suitable hardware components.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. A system for monitoring wear of an aircraft brake, comprising:
at least one sensor for sensing brake temperature, and for generating a brake temperature signal indicating brake temperature; and
means for receiving said brake temperature signal and determining an estimate of usage of said aircraft brake based upon said brake temperature signal, and for estimating a degree to which each individual brake application contributes to wear based upon said temperature signal.

* * * * *